Aug. 26, 1969     A. A. LIBBY, JR     3,463,440
REFLECTIVE PANELS FOR USE WITH LAWN FURNITURE AND THE LIKE
Filed May 1, 1967
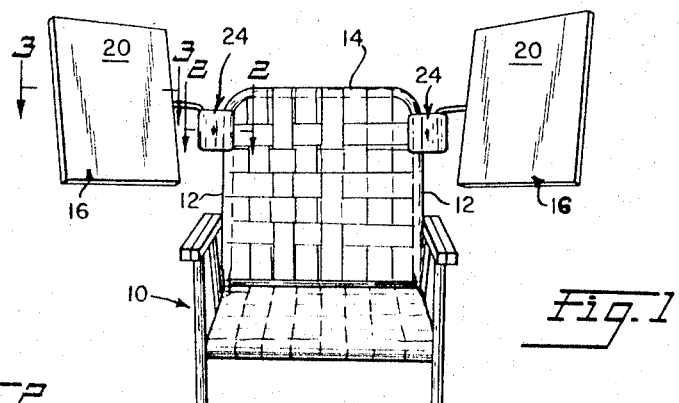
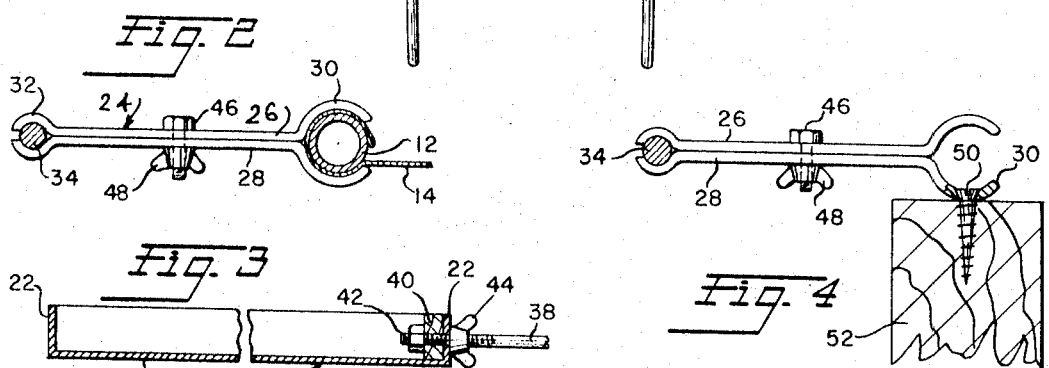
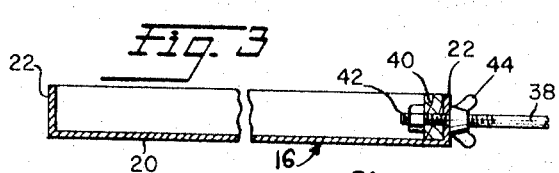
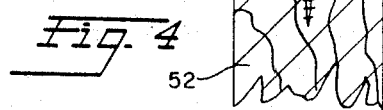
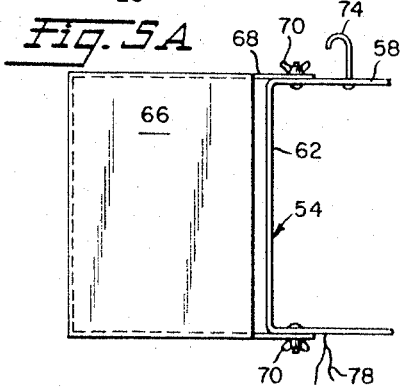
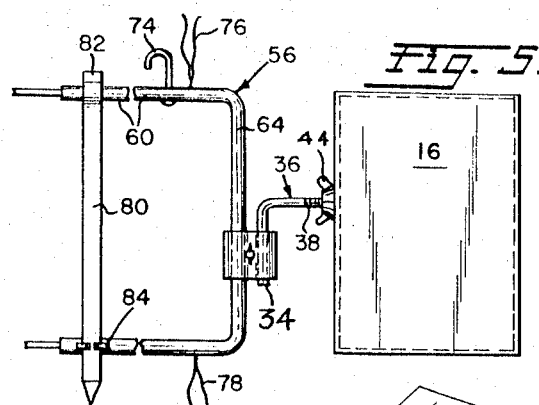
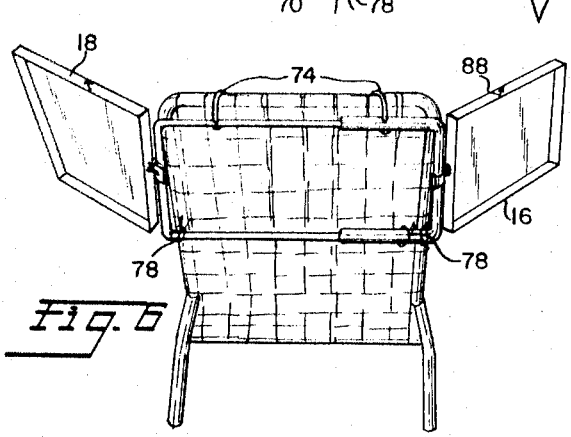
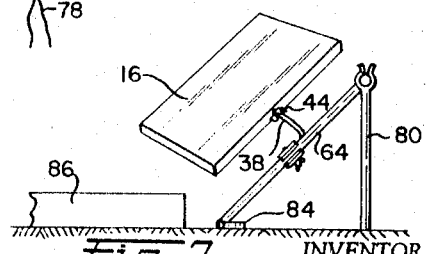
INVENTOR
ARTHUR A. LIBBY, JR.
BY Scrivener, Parker, Scrivener & Clarke
ATTORNEYS

United States Patent Office 3,463,440
Patented Aug. 26, 1969

3,463,440
REFLECTIVE PANELS FOR USE WITH LAWN
FURNITURE AND THE LIKE
Arthur A. Libby, Jr., Rte. 2, Box 360,
Arnold, Md. 21012
Filed May 1, 1967, Ser. No. 635,027
Int. Cl. A47c 1/00
U.S. Cl. 248—487
8 Claims

ABSTRACT OF THE DISCLOSURE

Reflective panels especially adapted for detachable mounting onto the sides of lawn furniture or the like to reflect sunlight onto a sunbather on the furniture; the panels being universally adjustable to insure maximum effect for the reflected sunrays, means also being provided for supporting the panels on the ground.

---

This invention relates to reflective panels especially adapted for mounting onto lawn furniture and the like for sunbathing purposes.

The broad object of the present invention is to provide a pair of reflective panels which may be detachably mounted onto the backs or sides of lawn furniture. The invention includes improved means for universally adjusting the panels for maximum reflection so that a sunbather can receive the benefit of sunlight on portions of his body which might normally be shaded.

Other objects and their attendant advantages will become apparent as the following detailed description is read in conjunction with the accompanying drawings wherein:

FIG. 1 is a perspective view of a conventional lawn chair of tubular construction showing the panels of the invention secured to the back of the chair;

FIG. 2 is a horizontal cross-sectional view taken substantially on the line 2—2 of FIG. 1 and showing mounting means for the panels of FIG. 1;

FIG. 3 is a horizontal cross-sectional view taken substantially on the line 3—3 of FIG. 1;

FIG. 4 is a view similar to FIG. 2 but showing an alternative means for mounting the support member of the invention onto lawn furniture of wood frame construction;

FIGS. 5a and 5b are vertical plan views showing alternative means for mounting the panels of the invention onto lawn furniture;

FIG. 6 is a rear perspective view of lawn furniture showing the alternative mounting means of FIGS. 5a and 5b attached to the lawn furniture, and FIG. 7 shows another arrangement of the device placed directly on the ground adjacent a mattress.

Referring now to the drawings and particularly to FIG. 1, 10 designates a conventional lawn chair having a bent tubular frame 12 to which are attached strips of plastic webbing 14 in a manner which is well known. Attached to the side parts of the tubular frame 12 of the chair 10 are reflective panels 16 constructed in accordance with the invention. The panels 16 are desirably rectangular and each has a reflective surface 20 which may be aluminum foil on a suitable backing or, as shown in FIG. 3, may be a flat face of a metallic pan-like member having rearwardly extending right angular flanges 22 to provide strength and stiffness to the panel.

The panels shown in FIG. 1 are detachably connected to the side parts of lawn furniture by means of clamps 24 which may comprise a pair of mating members 26, 28 as shown in FIG. 2 having arcuate end parts 30, 32 for clamping the side parts 12 of the chair 10 and the vertical leg part 34 of an L-shaped support member 36 (more clearly shown in FIG. 5b), which has a horizontal leg 38 threaded at its outer end and extending through a central aperture on the inner flange 22 of a panel 16. The threaded end of the leg 38 may also be received through a wooden backup member 40 as shown in FIG. 3 and receive on its outer end a nut 42. Threaded on the outer side of the threaded part of the leg 38 is a butterfly nut 44 which can be tightened against the flange 22 to retain the panel 16 in any selected angular position. Referring again to FIG. 2 the two parts 26, 28 of the clamping member are squeezed together by means of a bolt 46 and butterfly nut 48, the arrangement being such that the butterfly nut 48 can be released slightly whenever necessary to permit the vertical leg 34 of the L-shaped support member 36 to be swivelled about an axis parallel to the side parts of the chair, it being understood that with the clamp thus permitting angular adjustment of the panels about a vertical axis and horizontal leg 38 of the L-shaped support member permitting adjustment about a horizontal axis, the panels may be universally positioned in any of an infinite number of positions whereby the full benefit of the reflected sunrays may be received by the user. It will be noted in FIG. 2 that the arcuate parts 30 of the clamps which are adapted to embrace the side parts of the chair are preferably designed so as not to unduly strain the webbing material where it is engaged by the clamp, it being understood that the webbing yields sufficiently so as not to interfere in any way with the proper mounting of the clamps onto the chair.

Though the majority of modern day lawn furniture is of tubular construction as shown in FIG. 1, some lawn furniture is of redwood frame construction and in order to accomodate the invention to this type of furniture, one of the arcuate parts 30 of one of the clamp members may be drilled to receive wood screws 50 which may be screwed into the front or rear side of a wooden frame member 52 of the lawn chair or the like.

Referring now to FIGS. 5a and 5b in lieu of the individual clamps as shown and described in connection with FIGS. 1 through 4, the mounting means may comprise a pair of U-shaped tubular members 54, 56 defining an open frame having confronting telescoping legs 58, 60, which cooperate telescopically with each other, and vertical end parts 62, 64. In use the frame is adapted to be positioned substantially wholly behind the back of an article of furniture and the telescopic arrangement permits the frame to be adjusted to lawn furniture having backs of varying widths and, as shown in FIG. 5a, a panel 66 may be provided with inwardly extending, vertically spaced horizontal projections 68 which may be attached to the horizontal legs of one of the frame members, say frame 58, by means of bolts and butterfly nuts 70 as shown. Alternatively, a panel 16 identical to those shown in FIG. 1 may be attached to a vertical leg, such as leg 64 shown in FIG. 5b, by the same clamping means 24 and L-shaped support 36 as previously descirbed in connection with FIGS. 1 through 3. That is to say, instead of being clamped directly to the chair, the panel is clamped in the same manner to the vertical frame part.

The upper horizontal legs 58, 60 or the frames may be provided with hooks 74 for engagement with a horizontal tubular part of the back of a chair or chaise or, in lieu of the hooks, ties 76 may be provided for tying the upper part of the frame members to the back of lawn furniture for which hooks would not be suitable. In like manner, the lower parts of the frames may be provided with ties 78 which serve not only to fasten the lower part of the frame to the back of lawn furniture, but also the ties permit angular adjustment of the frame with respect to the back of the lawn furniture; that is to say, the lower part of the frame can be tied closer to or further away from the back depending upon the position of the back with respect to the sun. The frame type of support is well adapted for use with chaise lounges where the back is adjustable in any one of three or four selected positions with the lower tie 78 being utilized for precise positioning of the panels after the back of the chaise has been approximately adjusted by movement to the closest optimum position.

FIG. 6 illustrates the use of the frame type support in connection with a chaise lounge where it will be noted that the hooks 74 are received over the upper horizontal part of the back and the lower parts of the telescopic sections are connected to the side portions of the frame by means of the ties 78.

In accordance with the invention the frame illustrated in FIGS. 5a and 5b may be utilized in connection with a mattress laid directly on the ground. For this use, there is provided a support leg 80 which may have a clip 82 at its upper end to be received on the upper horizontal leg part 60 of the frame 26. The lower leg part 60 of the frame may be provided with a second clip 84 or this may be connected to the leg 80, in either case the clip being arranged to releasably connect the lower part of the leg 80 to the lower part of the frame. With this arrangement, as illustrated in FIG. 7, the frame may be placed directly on the ground 85 with the panels 16 or 66 suitably positioned with respect to a mattress 86, to reflect sunlight onto a bather lying on the mattress. The leg 80 is sufficiently long to permit positioning of the frame between a nearly vertical position to a position of aprroximately 45° with respect to the horizontal.

To insure that the panels are correctly positioned to reflect sunlight onto a person seated on lawn furniture employing the panels, the upper surfaces of the flanges 22 may be provided with small arrows 88 at 45° with respect to the side edges of the panel. When the user adjusts the panels so that the arrows are pointing directly at the sun, optimum reflection will be cast onto the sunbather.

What is claimed is:

1. Sunlight reflective means for attachment to lawn furniture or the like of the type having a back,/an open frame comprising a pair of confronting U-shaped members each having a pair of vertically spaced horizontal legs interengageable with the legs of the other of said members, means for releasably connecting said legs for horizontal adjustment of the width of said frame. means carried by said frame for releasably connecting said frame to the back of an article of furniture in a position wherein said frame is substantially wholly behind said back, and means universally pivotally connecting said reflective panel to a side part of said frame so that said panel extends forwardly beyond the back of said article of furniture to a distance sufficient to enable said panel to reflect sunlight onto a person seated on said article of furniture.

2. The reflective means of claim 1 wherein the pivotal connecting means comprises a clamp and an inverted L-shaped support member having vertical and horizontal legs, said clamp having a first part for clampingly engaging a side part of said frame and a second part for clampingly engaging the vertical leg of said L-shaped support member, and means adjustably connecting said panel to the horizontal leg of said L-shaped support means.

3. The reflective means of claim 1 including auxiliary support means carried by said frame, said support means being angularly adjustable with respect to said frame and constructed and arranged to engage the ground or the like and support said frame in a substantially upright position on said ground.

4. The reflective means of claim 1 wherein the releasable connecting means include hooks for engagement with the upper side of an article of furniture.

5. The reflective means of claim 1 wherein the releasable connecting means include ties adapted to be tied about side parts of said frame.

6. The reflective means of claim 1 wherein the means for attaching the panel to said frame comprises a clamp for clampingly engaging a side part of said frame, and support means interconnecting said clamp and said panel, said support means including adjustable means for adjusting the angularity of said panel with respect to the side part of said frame.

7. The reflective means of claim 1 wherein one pair of said legs is telescopically received within the other pair of said legs.

8. Sunlight reflective means for attachment to an article of furniture comprising a flat panel having a relatively stiff reflective face, means for releasably and universally adjustably connecting the panel to an article of furniture adpacent a side thereof so as to reflect sunlight onto a person seated on the furniture, and angularly disposed indicia disposed on said panel and arranged that when pointed at the sun the panel is optimally positioned to reflect sunlight onto a pre-selected area.

References Cited

UNITED STATES PATENTS

| 661,051 | 11/1900 | Horton | 350—305 |
| 1,284,596 | 11/1918 | Civitillo | 248—480 X |
| 1,758,021 | 5/1930 | Barakauskas | 248—480 |
| 842,313 | 1/1907 | Harrison | 248—475 X |
| 1,465,213 | 8/1923 | Feinberg | 248—487 |

FOREIGN PATENTS

| 188,911 | 11/1922 | Great Britain. |
| 314,238 | 6/1929 | Great Britain. |
| 287,516 | 4/1953 | Switzerland. |

ROY D. FRAZIER, Primary Examiner

FRANK DOMOTOR, Assistant Examiner

U.S. Cl. X.R.

248—156, 229, 279, 480; 297—185